(12) United States Patent
Nishikawa

(10) Patent No.: US 6,822,967 B1
(45) Date of Patent: Nov. 23, 2004

(54) RELAY UNIT AND FRAME TRACING METHOD

(75) Inventor: Shunpei Nishikawa, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/406,810

(22) Filed: Sep. 28, 1999

(30) Foreign Application Priority Data

Apr. 16, 1999 (JP) .......................................... 11-108994

(51) Int. Cl.[7] ............................................ H04L 12/28
(52) U.S. Cl. ..................... 370/413; 370/389; 370/395.7
(58) Field of Search ................................ 370/231, 235, 370/235.1, 389, 390, 395.7, 395.72, 412, 413, 428

(56) References Cited

U.S. PATENT DOCUMENTS

| | | | | |
|---|---|---|---|---|
| 4,403,285 A | * | 9/1983 | Kikuchi ...................... 709/104 |
| 4,807,224 A | * | 2/1989 | Naron et al. ................. 370/218 |
| 5,210,749 A | * | 5/1993 | Firoozmand ................. 370/463 |
| 5,283,788 A | * | 2/1994 | Morita et al. ................ 370/236 |
| 5,291,482 A | * | 3/1994 | McHarg et al. ............. 370/413 |
| 5,359,568 A | * | 10/1994 | Livay et al. ................. 711/109 |
| 5,541,864 A | * | 7/1996 | Van Bavel et al. .......... 708/313 |
| 6,076,117 A | * | 6/2000 | Billings ....................... 709/253 |
| 6,212,568 B1 | * | 4/2001 | Miller et al. ................ 370/498 |

\* cited by examiner

*Primary Examiner*—Hassan Kizou
*Assistant Examiner*—David Odland
(74) *Attorney, Agent, or Firm*—Staas & Halsey LLP

(57) ABSTRACT

In a relay unit for relaying frames between a sending source and a receiving end by transmitting the frames from a transmitting-receiving buffer to the receiving end after the frames received from the sending source have temporarily been stored in the transmitting-receiving buffer, the frames are in the transmitting-receiving buffer, while the storage positions of the frames in the transmitting-receiving buffer are being managed in order of storage. Each time a new frame is stored in the transmitting-receiving buffer after the number of the frames in the transmitting-receiving buffer has reached a predetermined number, the storage area, in which the oldest frame among the frames is stored, is released from the transmitting-receiving buffer. With this arrangement, by contriving how to utilize the transmitting-receiving buffer, tracing a frame can be performed at high speeds, without providing a dedicated storage area for storing trace information and incurring complexity of the process.

19 Claims, 15 Drawing Sheets

F I G. 12
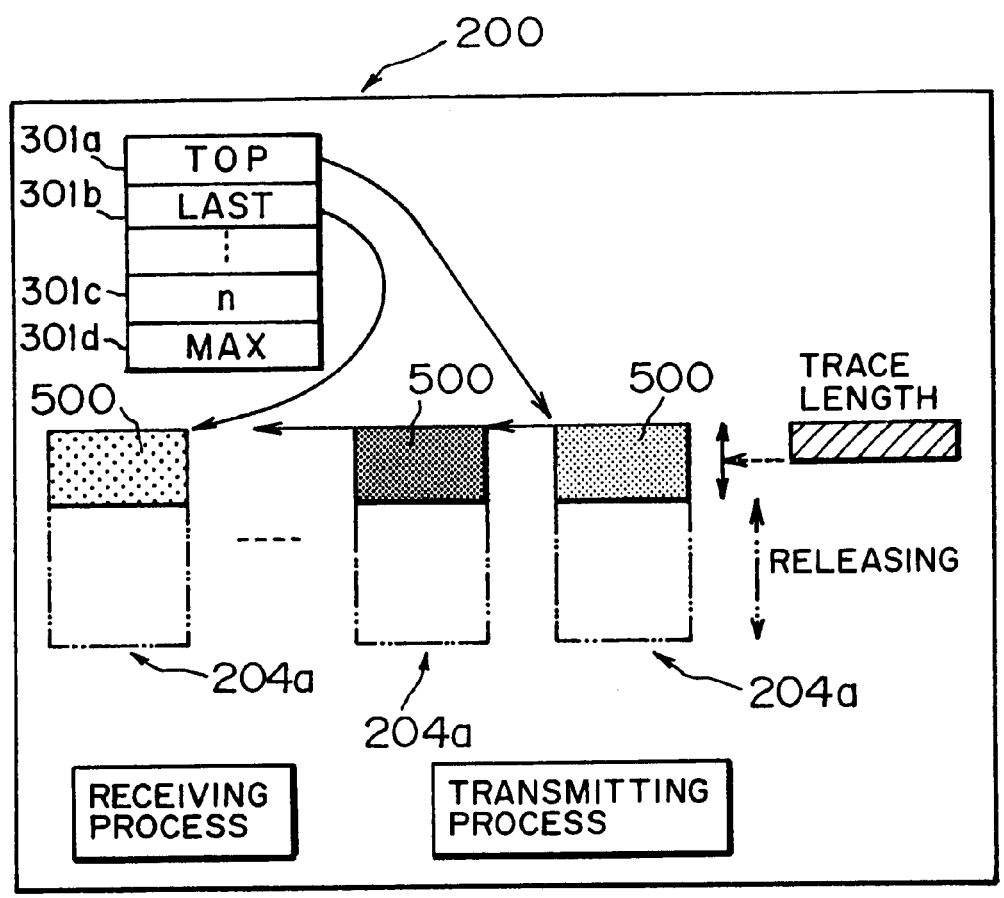

RELAY UNIT AND FRAME TRACING METHOD

BACKGROUND OF THE INVENTION (1) Field of the Invention

The present invention relates to a relay unit and a frame tracing method that relay frames between a sending terminal and a receiving terminal belonging to different networks and are suitable for use in a network relay unit for managing the history of the process of relaying such transmission-reception of frames.

(2) Description of the Related Art

FIG. 13 is a block diagram for explaining an example of how a general relay unit is used. A relay unit (network relay unit) 100 shown in the diagram relays the transmission-reception of a frame (packet) between a plurality-of networks (in FIG. 13, three networks A to C). The relay unit 100 is respectively connected to the networks A to C through I/O interfaces 101a to 101c such that a frame can be transmitted and received between the networks A to C.

For instance, when a frame is transmitted from a sending terminal belonging to the network A through the relay unit 100 to a receiving terminal belonging to the network B, the relay unit 100 receives the frame transmitted from the network A, through the I/O interface 101a and then judges a receiving end, for example, from information recorded on the header portion of the frame and then transmits the frame to the receiving end of the network B through the I/O interface 101b.

In such a relay unit, tracing the history of the frame relaying operation is performed as a countermeasure at the time of a fault occurrence, for example.

FIG. 14 is a block diagram showing the construction of the aforementioned relay unit 100 in further detail. As shown in the diagram, the relay unit 100 is constituted by a CPU 102, I/O interfaces 101a to 101c, a bus 103, and a random access memory (RAM) 104. With this arrangement, the relay unit 100 relays the transmission-reception of a frame between a plurality of networks A to C.

The I/O interfaces (hereinafter referred to as simply interfaces) 101a to 101c are respectively connected to the networks A to C, as previously described, and are also connected to the CPU 102 and the RAM 104 through the bus 103, whereby a frame can be delivered between the relay unit 100 and each of the networks A to C.

The RAM 104 stores various kinds of data or the like. This RAM 104 ensures both an area for a transmitting-receiving buffer 104b that temporarily stores a frame received from a sending terminal and an area for a trace buffer 104a that stores the whole or part of the frame stored in the transmitting-receiving buffer 104b.

The bus 103 interconnects the interfaces 101a to 101c, the CPU 102, and the RAM 104, as previously described, and delivers various kinds of data or the like.

In the relay unit 100, the CPU 102 controls operation of the interfaces 101a to 101c, the RAM 104 and the like, thereby executing the frame relaying process and the frame tracing process as described infra.

FIG. 15 is a diagram for explaining a conventional frame tracing method in the relay unit 100 shown in FIG. 14. As shown in FIG. 15, the relay unit 100 temporarily stores a received frame in the transmitting-receiving buffer 104b and then copies the whole or part of the frame stored in the transmitting-receiving buffer 104b to the trace buffer 104a.

For example, when data is transmitted from a terminal A1 of the network A to a terminal B1 of the network B through the relay unit 100 by the aforementioned construction, in the relay unit 100 the frame transmitted from the terminal A1 is received by the interface 101a as shown in FIG. 14, and this frame is temporarily stored in the transmitting-receiving buffer 104b of the RAM 104 through the bus 103, as shown by a dotted arrow a in FIG. 14.

Also, in the relay unit 100, either the whole frame stored in the transmitting-receiving buffer 104b or a portion of the frame including its header portion is copied in sequence to the trace buffer 104a of the RAM 104.

And the CPU 102 refers, for example, to information about the protocol header included in the header portion of the frame stored in the transmitting-receiving buffer 104b and then recognizes, based on the address or the like of the receiving end (terminal B1), that a network to which the terminal B1 belongs is the network B. After recognition, the CPU 102 transmits the frame from the transmitting-receiving buffer 104b through the bus 103 to the interface 101b connected to the network B, as shown by a dotted arrow b in FIG. 14. The interface 101b receiving the frame from the transmitting-receiving buffer 104b transmits the frame to the network B.

In addition, for example, in the case where the transmission of a frame has been completed or where the frame is abandoned by reasons such that no receiving end is found, the CPU 102 releases an area where the frame was stored, from the transmitting-receiving buffer 104.

In this manner, in the relay unit 100, the transmission-reception of a frame is relayed between a plurality of networks and also the whole or part of the relayed frame is stored in the trace buffer 104a as data to be traced (trace data). Trace data is thus stored in the trace buffer 104a, whereby the history of the relaying operation in the relay unit 100 can be managed.

And the trace data, which was stored in the trace buffer 104a, is traced and analyzed. With this, which I/O operation (relaying operation) has been performed can be known. Therefore, the trace data becomes important information, for example, when a fault is checked or when debugging is performed. Particularly, in the case where the relay unit 100 is operated with firmware, for example, it becomes important information.

However, in the conventional frame tracing method in the aforementioned relay unit 100, in the RAM 104 the whole or part of the frame stored in the transmitting-receiving buffer 104b is copied in sequence to the trace buffer 104a, but generally the speed of accessing (reading and writing) memory is considerably slower compared with the command executing time in the CPU 102 and therefore in the RAM 102 the process of copying data from the transmitting-receiving buffer 104b to the trace buffer 104a takes substantial time. For this reason, there is also a possibility that the copying process will increase the overhead time in the CPU 102 and constitute a hindrance to the relaying operation.

On the other hand, in Japanese Laid-Open Patent Publication No. HEI 4-135348, in a LAN controller a method is disclosed which directly writes the head portion of a frame including its header to a trace buffer and also writes the remaining portion excluding the head portion to a transmitting-receiving buffer, in order to eliminate copying a frame between memories and enhance the processing speed.

However, this method has to provide a dedicated trace buffer or previously ensure an area for a trace buffer onto memory. When a dedicated trace buffer is provided, an increase in the manufacturing cost will be incurred. Also, when an area for a trace buffer is previously ensured on memory, an area on the memory cannot be effectively utilized.

Furthermore, when the method disclosed in the aforementioned publication is applied to the relay unit in which a frame received from a sending source, as it is, is transmitted to a receiving terminal, the received frame has to be divided into two parts and stored in different buffers. Subsequently, the two parts must be read out from the different buffers and again transmitted as a single frame. That is, the aforementioned method requires both the process of dividing a frame when it is received and the process of reconstituting the divided parts when they are transmitted, so that there is also a problem that the process will become complicated.

SUMMARY OF THE INVENTION

The present invention has been made in view of the aforementioned problems. Accordingly, it is an object of the present invention to provide a relay unit and a frame tracing method in the same unit which are capable of performing the process of tracing a frame at high speeds, without providing a dedicated storage area for storing trace information and incurring complexity of the process, by contriving how to utilize a transmitting-receiving buffer.

To achieve the foregoing object and in accordance with one important aspect of the present invention, there is provided a relay unit for relaying frames between a sending source and a receiving end by transmitting the frames from a transmitting-receiving buffer to the receiving end after the frames received from the sending source have temporarily been stored in the transmitting-receiving buffer, the trace unit comprising: a management table in which storage positions of the frames in the transmitting-receiving buffer are managed in order of storage; and a control section for controlling both the storage of each frame in the transmitting-receiving buffer and release of a storage area for each frame from the transmitting-receiving buffer by referring to the management table; wherein the control section causes the transmitting-receiving buffer to hold the frames and also releases a storage area, in which the oldest frame among the frames is stored, from the transmitting-receiving buffer, each time a new frame is stored in the transmitting-receiving buffer after the number of the frames in the transmitting-receiving buffer has reached a predetermined number.

According to another important aspect of the present invention, in the relay unit for relaying frames between a sending source and a receiving end by transmitting the frames from a transmitting-receiving buffer to the receiving end after the frames received from the sending source have temporarily been stored in the transmitting-receiving buffer, there is provided a method of tracing the frames to obtain a history of the relaying operation, comprising the steps of: holding the frames in the transmitting-receiving buffer, while storage positions of the frames in the transmitting-receiving buffer are being managed in order of storage; and releasing a storage area for the frame oldest among the frames from the transmitting-receiving buffer, each time a new frame is stored in the transmitting-receiving buffer after the number of the frames in the transmitting-receiving buffer has reached a predetermined number.

Therefore, according to the relay unit and the frame tracing method of the present invention, a predetermined number of frames, including the newest frame, are always stored in order of storage in the transmitting-receiving buffer. For tracing, the header portion or the like of the frame 500 does not need to be copied or moved to a dedicated area. Besides, processing such as dividing and reconstituting of frames is also unnecessary. The process of tracing frames can be performed at high speeds without incurring an increase in the overhead time of the CPU and process complexity. Furthermore, since there is no need to provide a dedicated memory or area, there is no possibility that an increase in the manufacturing cost will be incurred and there is an advantage that can effectively utilize the area of memory or like in the relay unit.

Note that the management table may include (1) a frame management table in which a storage position of each frame is registered, the frame management table being provided for each frame; and (2) a trace management table in which a position of the frame management table corresponding to the oldest frame and a position of the frame management table corresponding to the newest frame are registered as a head-frame pointer and a last-frame pointer, respectively. In each frame management table, a position of the frame management table corresponding to a frame stored next to a corresponding frame in the transmitting-receiving buffer may be registered as a next-frame pointer. With this, there is an advantage that can manage the frames stored in the transmitting-receiving buffer, in order of storage with reliability.

Also, the control section may release the storage area for the oldest frame from the transmitting-receiving buffer, by rewriting the head-frame pointer in the trace management table such that the head-frame pointer indicates the position of the frame management table corresponding to the frame stored next to the oldest frame. With this, the storage area for the oldest frame can be released from the transmitting-receiving buffer at high speeds, whereby there is an advantage that can ensure a storage area for storing the newest frame.

In addition, the number of the frames and the predetermined number in the transmitting-receiving buffer may be registered in the trace management table, and the control section may discriminate whether or not the number of the frames in the transmitting-receiving buffer has reached the predetermined number, by referring to the trace management table. With this, each time a new frame is stored in the transmitting-receiving butter after the number of frames in the transmitting-receiving butter has reached a predetermined number, the storage area for the oldest frame can be released from the transmitting-receiving butter, so that there is an advantage that can efficiently use the transmitting-receiving butter.

Moreover, a predetermined area for each frame in the transmitting-receiving buffer may be copied to a retention medium in order of storage and archived as trace information. With this, there is an advantage that can easily archive trace information at high speeds.

Furthermore, only a predetermined area for each frame in the transmitting-receiving buffer may be held in the transmitting-receiving buffer and a storage area for each frame excluding the predetermined area may be released from the transmitting-receiving buffer. With this, the storage area in the transmitting-receiving buffer for tracing the frame can be reduced, so that there is an advantage that can enhance the efficiency of using the transmitting-receiving buffer.

Note that the relay unit of the present invention may further include a specification section for specifying the predetermined area to be held in the transmitting-receiving buffer. With this, there is an advantage that can arbitrary set a predetermined area to be held in the transmitting-receiving buffer.

BRIEF DESCRIPTION OF THE DRWAINGS

The above and other objects and advantages will become apparent from the following detailed description when read in conjunction with the accompanying drawings wherein:

FIG. 12 is a diagram for specifically explaining the control function of the CPU (control section) in the relay unit as the one embodiment of the present invention;

DESCRIPTION OF THE PREFERRED EMBODIMENTS

An embodiment of the present invention will hereinafter be described with reference to the drawings.

Figure 2:
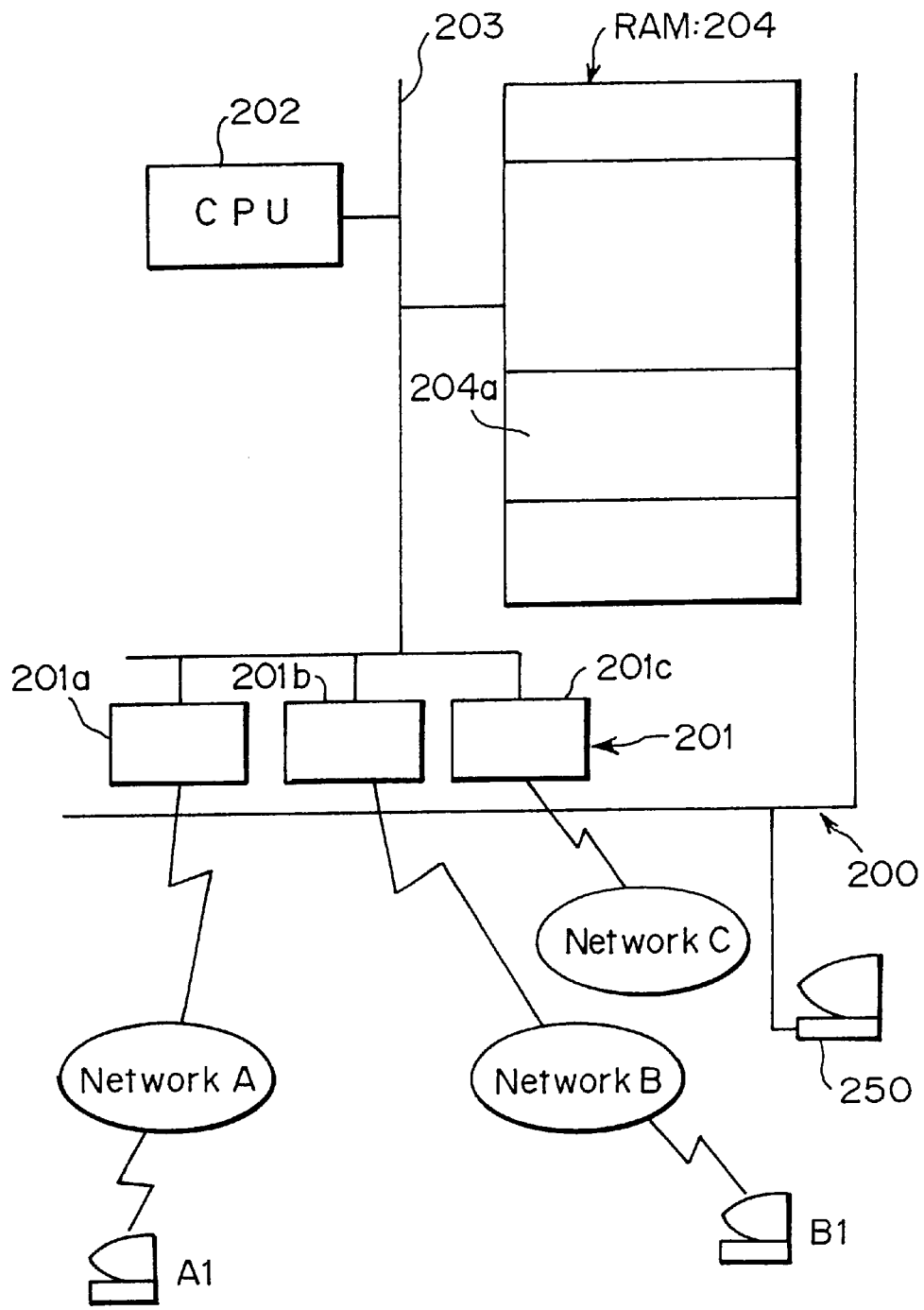
FIG. 2 is a block diagram showing the construction of the relay unit as the one embodiment of the present invention.
Figure 13:
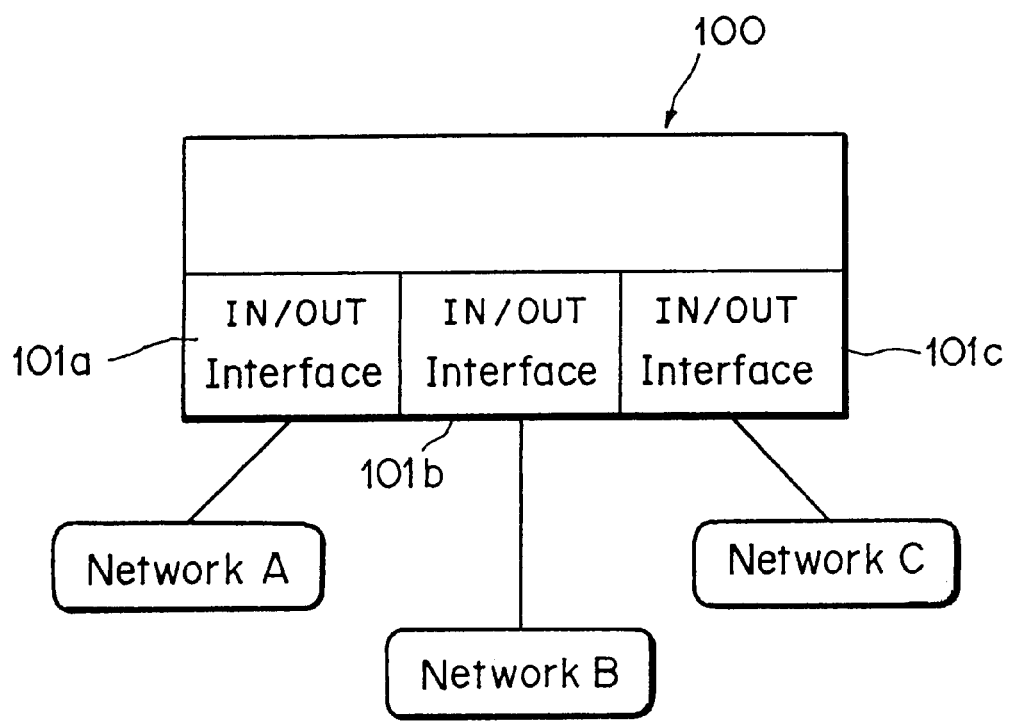
FIG. 13 is a block diagram for explaining how a general relay unit is used.
Figure 14:
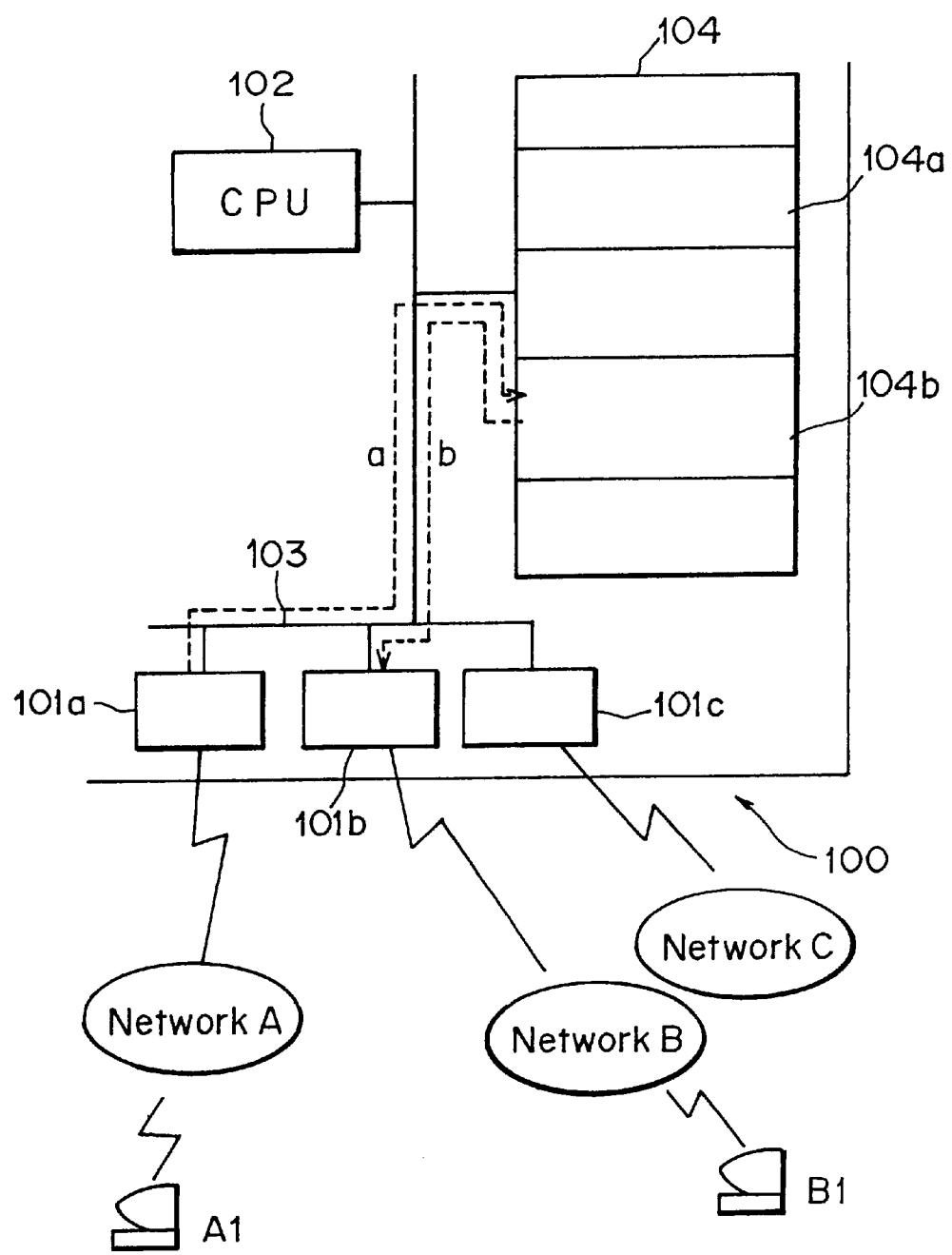
FIG. 14 is a block diagram showing the construction of the general relay unit.
Figure 15:
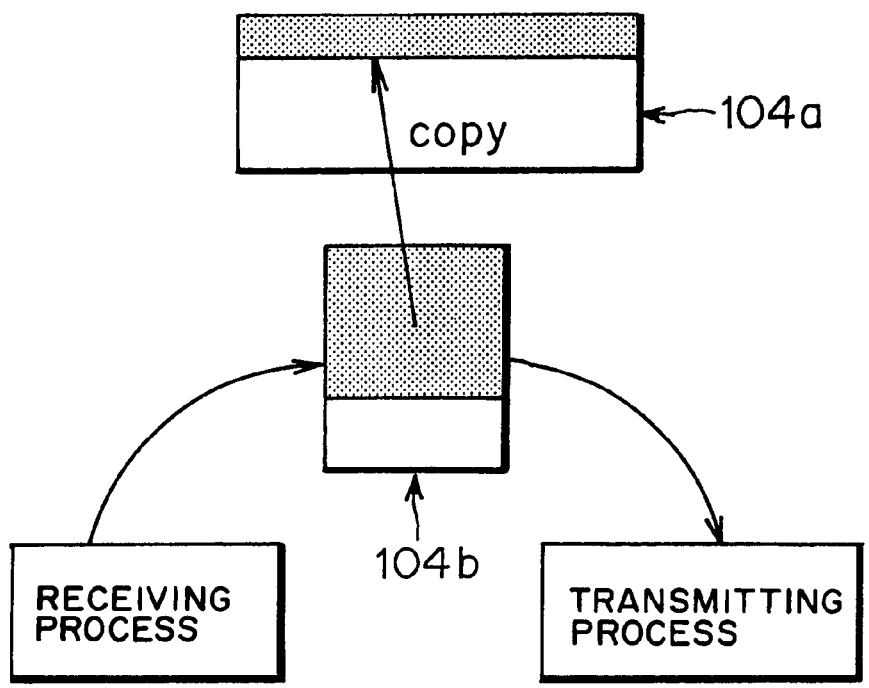
FIG. 15 is a diagram for explaining a conventional frame tracing method in the relay unit.

FIG. 2 is a block diagram showing the construction of a relay unit as one embodiment of the present invention. As shown in the diagram, the relay unit 200 in this embodiment, as with the relay unit 100 shown in FIG. 13, is a network relay unit that relays the transmission-reception of a frame (packet) between a plurality of networks (in FIG. 2 three networks A to C). The relay unit 200 is constituted by a CPU (control section) 202, I/O interfaces 201a to 201c (201), a bus 203, a random access memory (RAM) 204, and a console (specifying section) 250. The RAM 204, the I/O interfaces 201a to 201c, and the console 250 are controlled by the CPU 202.

The I/O interfaces (hereinafter referred to as simply interfaces) 201a to 201c are respectively connected to the networks A to C and are also connected to the CPU 202 and the RAM 204 through the bus 203, whereby a frame 500 (see FIGS. 1 and 3) can be transmitted and received between the relay unit 200 and each of the networks A to C.

Note that reference numerals 201a to 201c will hereinafter be employed when one of the plurality of interfaces needs to be specified, while reference numeral 201 will be employed when an arbitrary interface or interfaces are specified.

The bus 203 interconnects the interfaces 201, the CPU 202, and the RAM 204 as previously described and delivers various kinds of data, such as the frame 500 and the like.

The console 250 is constituted by a keyboard and a monitor and is used for inputting various instructions or the like from an operator and also performing maintenance.

The RAM 204 stores various data such as the frame 500 and the like. This RAM 204 ensures an area for a transmitting-receiving buffer 204a that temporarily stores the frame 500 received from a sending terminal.

Figure 1:
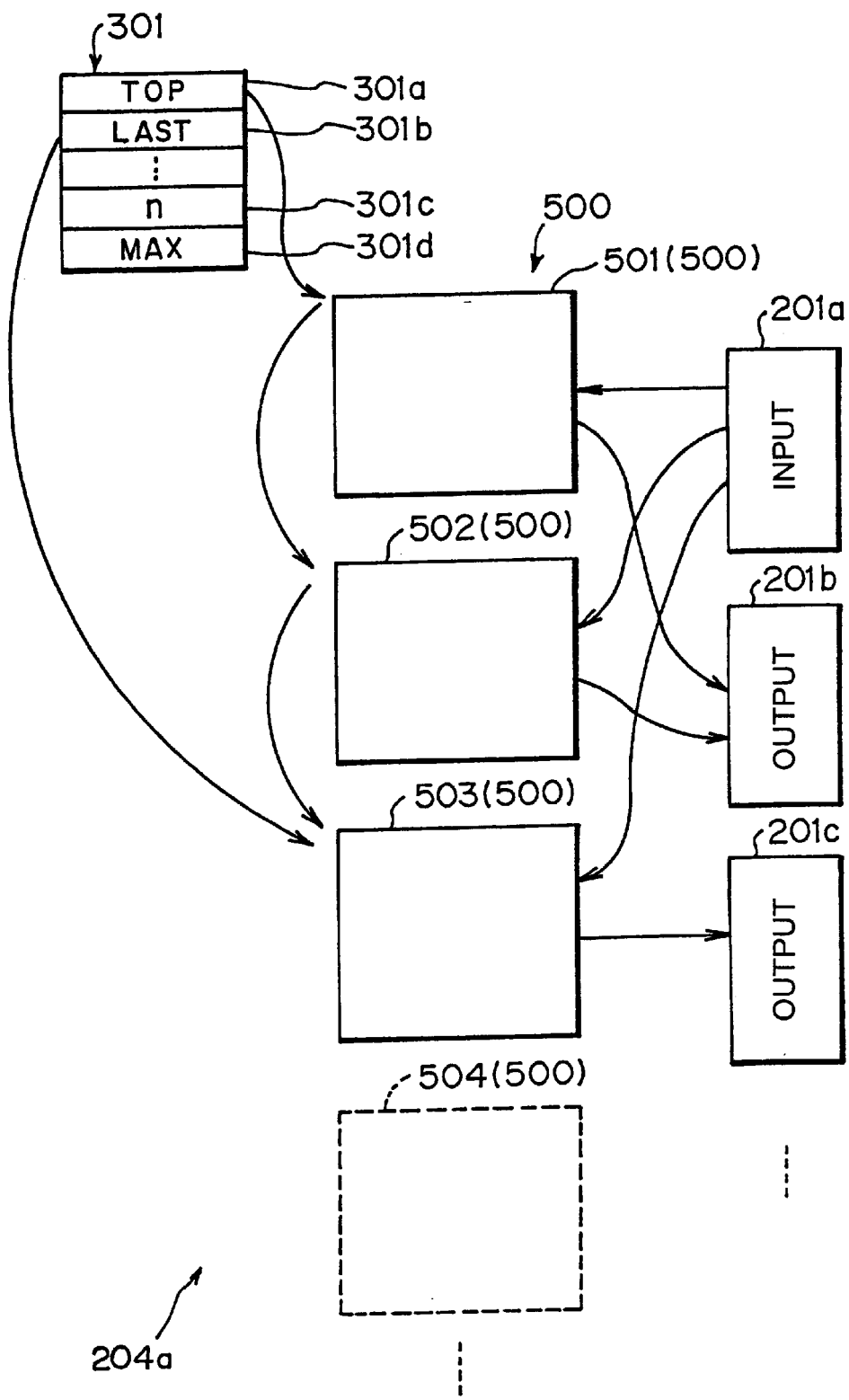
FIG. 1 is a diagram for explaining the stored state of a plurality of frames in the transmitting-receiving buffer of a relay unit as one embodiment of the present invention.
Figure 3:
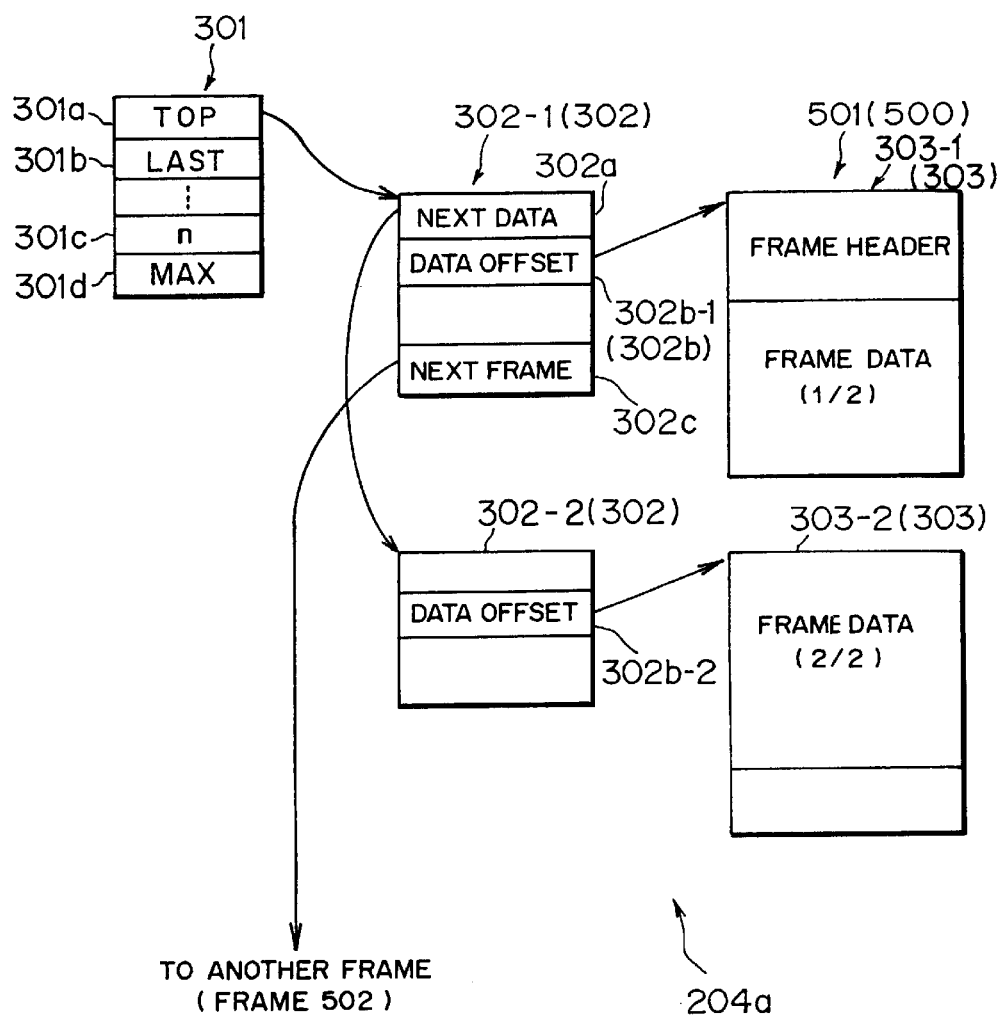
FIG. 3 is a diagram for explaining the stored state of each frame in the transmitting-receiving buffer of the relay unit as the one embodiment of the present invention.

Here, referring to FIGS. 1 and 3, a description will be made of the construction (frame stored state) of the transmitting-receiving buffer 204a of this embodiment. FIG. 1 is a diagram for explaining the stored state of a plurality of frames 500 (501 to 504) in the transmitting-receiving buffer 204a of this embodiment; FIG. 3 is a diagram for explaining the stored state of each frame 500 (in FIG. 3, frame 501) in the transmitting-receiving buffer 204a of this embodiment. Note that FIG. 1 shows the state in which a frame 504 is stored with three frames 501 to 503 already stored in the transmitting-receiving buffer 204a. Hereinafter, reference numerals 501 to 504 will be employed when one of the frames needs to be specified, while reference numeral 500 will be employed when an arbitrary frame or frames are specified.

The storage positions of the frames 500 in the transmitting-receiving buffer 204a are managed in the storage order of the frames 500, by a trace management table 301 and a frame management table 302 provided in the transmitting-receiving buffer 204a, as shown in FIGS. 1 and 3.

Although being omitted in FIG. 1, the frame management table 302 is provided for each frame 500. As described infra, the frame management table 302 registers the storage position of each frame 500 (in practice, the position of the frame management table 302 corresponding to a data block 303 that stores the frame 500).

As shown in FIG. 3, each frame 500 is stored in one or a plurality of data blocks 303, depending on its size. In FIG. 3 there is shown an example of dividing the frame 501 into two data blocks 303-1, 303-2 and stored. The data blocks 303-1 and 303-2 are storage areas for storing the frame 500, respectively. They have previously been generated at a predetermined size.

And, for example, in storing the frame 501 in the data blocks 303-1 and 303-2, from the head position of the data block 303-1 the frame 501 is stored in sequence from its header portion, and furthermore, the remaining portion of the frame 501 (frame data 2/2 portion in FIG. 3) that cannot be stored in the data block 303-1 is stored in sequence from the head position of the data block 303-2.

Note that in FIG. 3, while the frame 501 is divided into two data blocks 301-1, 303-2 and stored, the present invention is not to be limited to this. For example, according to the size of the frame 501, it may be stored in a single data block 303, or it may be divided into 3 or more data blocks 303 and stored.

The frame management table 302 provided for each frame 500, as previously described, is also provided for each data block 303. For instance, the frame 501 shown in FIG. 3 is provided with two frame management tables 302 (hereinafter expressed as 302-1, 302-2) respectively corresponding to two data blocks 303-1, 303-2. These frame management tables 302-1 and 302-2 register the storage positions of the data blocks 303-1 and 303-2, respectively.

More specifically, the frame management table 302-1 is provided with at least a data offset pointer 302b-1 indicating the position of the data block 303-1, a next-data pointer 302a indicating the position of the next frame management table 302-2, and a next-frame pointer 302c indicating the storage position of a frame 500 received next. Also, the frame management table 302-2 is provided with a data offset pointer 302b-2 indicating the position of the data block 303-2.

Here, the frame management table 302 shown in FIG. 3 corresponds to the frame 501, and next to this frame 501, the frame 502 is received and stored as shown in FIG. 1. Therefore, the next-frame pointer 302c indicates the storage position of the frame 502. Also, when the following data block 303 is not present, the next-data pointer 302a is in an unregistered state. In addition, in the frame management table 302 in which the position of the newest frame 500 (in FIG. 1, frame 503) without the following frame 500 is registered, the next-frame pointer 302c is in an unregistered state.

Note that in the following description, there are cases where, in describing the data offset pointer in the frame management table 302, reference numeral 302b is employed for this offset point.

When a single frame 500 is divided into a plurality of data blocks 303 and stored, the next-data pointer 302a in the aforementioned management table 302 can manage the storage positions of the data blocks 303 in order of storage. With this, it is possible to handle the frame 500, divided into a plurality of data blocks 303 and stored, as a single frame.

Furthermore, with the next-frame pointer 302c in the frame management table 302, the position of the frame 500 next stored (in FIG. 3, frame 501) can be known. Therefore, for a plurality of frames 500 received from various sending terminals, their storage positions in the transmitting-receiving buffer 204a can be managed in order of storage.

On the other hand, the trace management table 301 is provided with at least a top pointer (head-frame pointer) 301a, a last pointer (last-frame pointer) 301b, a frame-number holding portion 301c, and a maximum-frame-number holding portion 301d.

The top pointer 301a indicates the position of the frame management table 302 (302-1) corresponding to the oldest frame 500 in the transmitting-receiving buffer 204a; the last pointer 301b indicates the position of the frame management table 302 corresponding to the newest frame 500 (frame 500 received last) in the transmitting-receiving buffer 204a.

That is, the relay unit 200 of this embodiment can manage the storage positions of the frames 500 in the transmitting-receiving buffer 204a in order of storage, by the trace management table 301 and the frame management table 302.

The frame-number holding portion 301c holds the number n of frames 500 stored in the transmitting-receiving buffer 204a. In the relay unit of this embodiment, the CPU 202 increments the value n held in the frame-number holding portion 301c, each time a frame 500 is received from a sending source and held in the transmitting-receiving buffer 204a. With this increment, the number n of frames 500 stored in the transmitting-receiving buffer 204a is updated and registered in the frame-number holding portion 301c.

The maximum-frame-number holding portion 301d holds the maximum frame number MAX (predetermined number) that is the number of frames 500 which can be held in the transmitting-receiving buffer 204a. This maximum frame number MAX is previously set by the console 250 or the like in accordance with the capacity or the like of the RAM 204.

The CPU 202 compares the frame number n registered in the frame-number holding portion 301c of the trace management table 301 and the maximum frame number MAX registered in the maximum-frame-number holding portion 301d, by making reference to the frame-number holding portion 301c and maximum-frame-number holding portion 301d of the trace management table 301. When the frame number n has become equal to the maximum frame number MAX, the CPU 202 discriminates whether or not the number of frames 500 in the transmitting-receiving buffer 204a has reached a predetermined number.

Referring to the trace management table 301 and the frame management table 302, the CPU 202 also controls the storage of a frame 500 to the transmitting-receiving buffer 204a and the release of the storage area for a frame 500 from the transmitting-receiving buffer 204a.

That is, the CPU 202 compares the frame number n registered in the frame-number holding portion 301c of the trace management table 301 and the maximum frame number MAX registered in the maximum-frame-number holding portion 301d, as previously described. Then, until the frame number n in the transmitting-receiving buffer 204a reaches the maximum frame number MAX, received frames 500 are stored in sequence in the transmitting-receiving buffer 204a. After the number n of frames in the transmitting-receiving buffer 204a has reached the maximum frame number MAX, the data block 303 (storage area) for the oldest frame is released from the transmitting-receiving buffer 204a, each time a new frame 500 is stored in the transmitting-receiving buffer 204a. In this manner, the CPU 202 controls the transmitting-receiving buffer 204a such that a predetermined number MAX of frames 500 are always held in the buffer 204a.

Here, more specifically, the CPU 202 rewrites the top pointer 301a in the trace management table 301 such that the top pointer 301a indicates the position of the frame management table 302 corresponding to the frame 500 (e.g., frame 502 in FIG. 1) stored next to the oldest frame 500 (e.g., frame 501 in FIG. 1), in order to release the data block 303 from the transmitting-receiving buffer 204a. With this, the storage area for the oldest frame 500 (frame 501), namely the data blocks 303-1, 303-2 are released from the transmitting-receiving buffer 204a. Note that each time a new frame 500 is stored in the transmitting-receiving buffer 204a, the CPU 202 rewrites the last pointer 301b in the trace management table 301 such that the last pointer 301b indicates the position of the frame management table 302 corresponding to the new frame 500.

Also, the CPU 202 copies a predetermined area (e.g., a header portion, etc.) of the frame 500 in the transmitting-receiving buffer 204a in order of storage to a retention medium 600 (see FIG. 9), such as a floppy disk, tape and the like, as described infra. With this, the predetermined area for the frame 500 is stored as trace information that is information about the history of the relaying process. For instance, when collection and generation of the trace information is specified from the control 250 or the like, the trace information is stored.

Furthermore, when a predetermined area for the frame 500 in the transmitting-receiving buffer 204a is copied to collect and generate the trace information, as mentioned above, the position and size of the predetermined area to be copied can be specified from the console 250.

Here, referring to FIGS. 10 to 12, the control function of the CPU 202 in the relay unit 200 of this embodiment will be described specifically.

Figure 11:
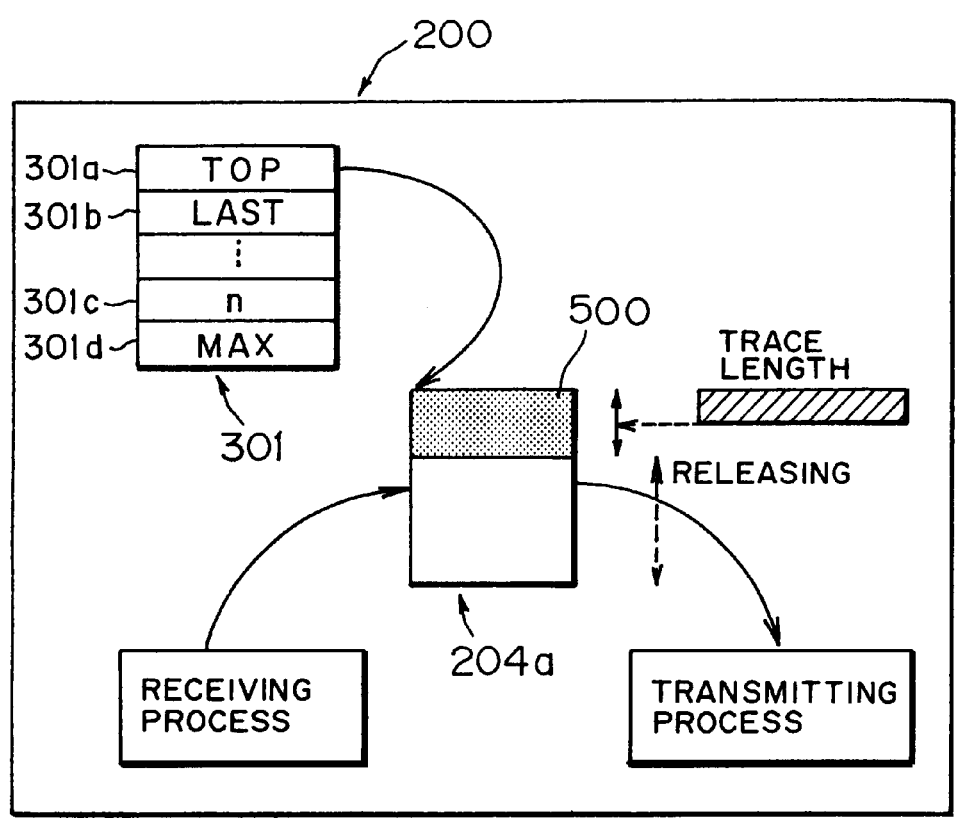
FIG. 11 is a diagram for specifically explaining the control function of the CPU (control section) in the relay unit as the one embodiment of the present invention.

As shown in FIG. 11, after transmitting the frame 500 stored in the transmitting-receiving buffer 204a, the CPU 202 releases the storage area (data block 303) for the frame 500, excluding the aforementioned predetermined area, from the transmitting-receiving buffer 204a. As a result, only the predetermined area for the frame 500 in the transmitting-receiving buffer 204a is held in the transmitting-receiving buffer 204a.

Figure 10:
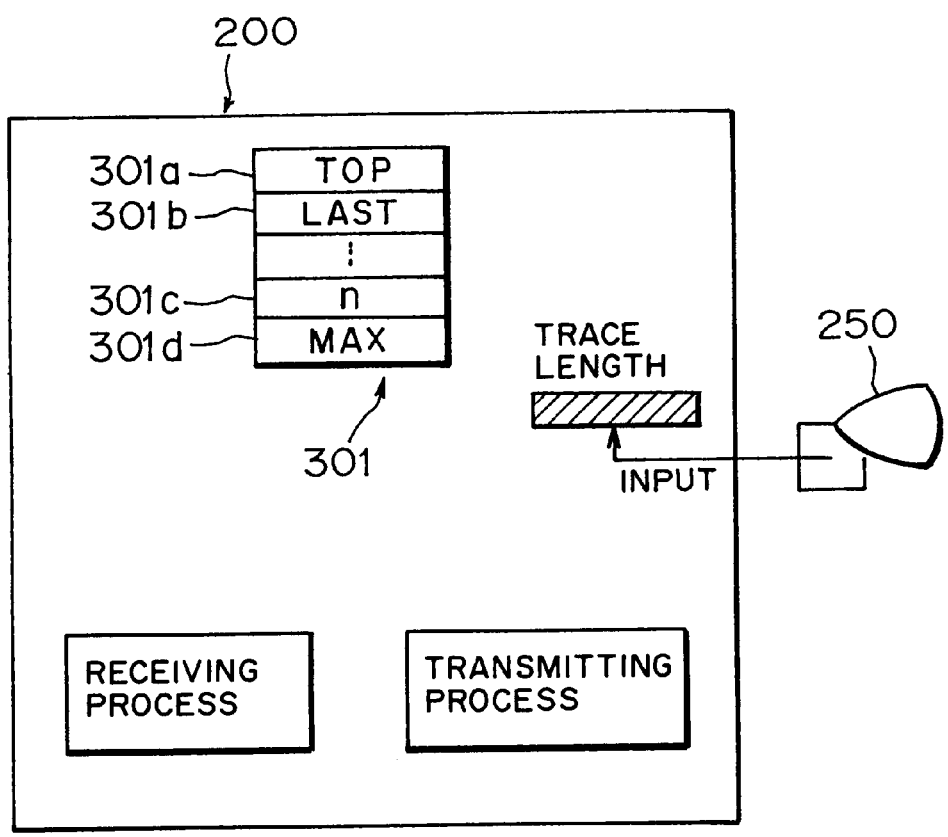
FIG. 10 is a diagram for specifically explaining the control function of a CPU (control section) in the relay unit as the one embodiment of the present invention.

And the position and size (trace length) of a predetermined area (trace area) for the frame 500 to be held in the transmitting-receiving buffer 204a can be specified from the console 250 by an operator, as shown in FIG. 10. Note that the aforementioned predetermined area is specified, for example, as a trace length from the head of the frame 500, by the console 250.

Note that even when relaying a plurality of frames 500 successively, the CPU 202 will release the storage area (data block 303) for each frame 500, excluding the predetermined area, from the transmitting-receiving buffer 204a, as shown in FIG. 12.

A description will hereinafter be made of the operation of the relay unit 200 as one embodiment of the present invention, constructed as described above.

First, when the relay unit 200 of this embodiment transmits data from the terminal A1 (sending source) of the network A to the terminal B1 (receiving end) of the network B, as shown in FIG. 2, the relaying operation and frame tracing operation of the relay unit 200 at this time will be described in order with reference to FIGS. 4 to 8.

FIGS. 4 to 8 are diagrams for explaining a method of managing frames 500 stored in the transmitting-receiving buffer 204a by the trace management table 301, in the relay unit 200 of this embodiment.

Figure 4:
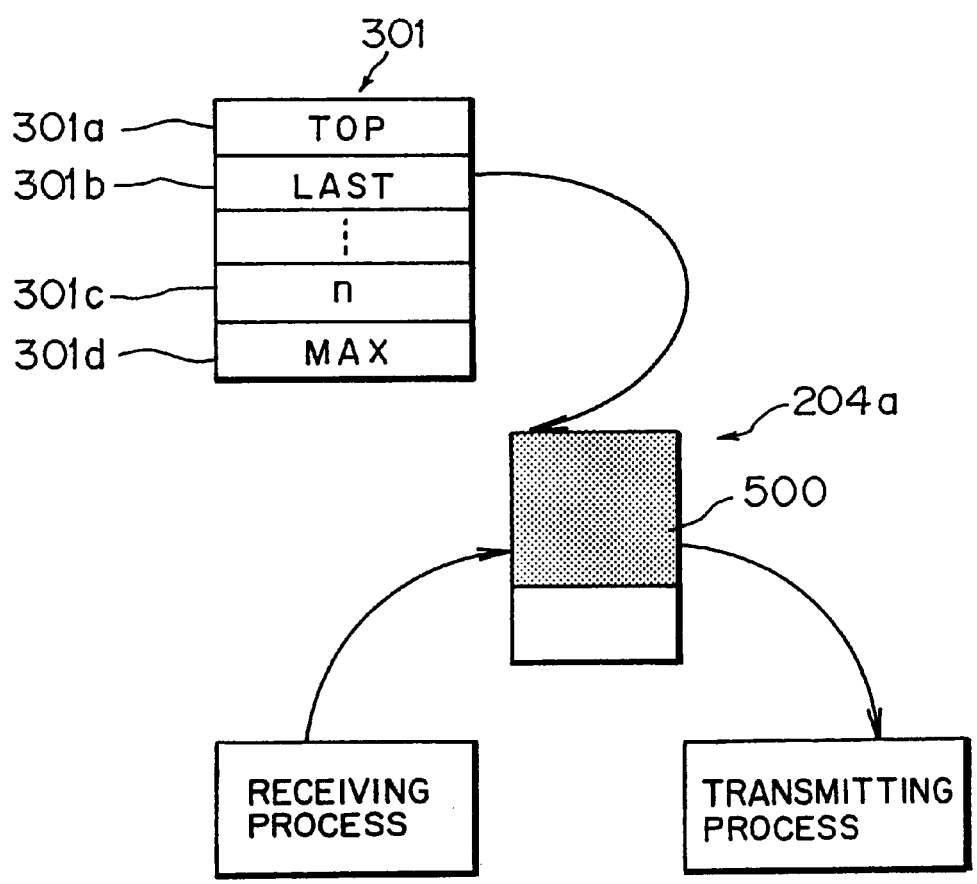
FIG. 4 is a diagram for explaining a method of managing frames stored in the transmitting-receiving buffer by a trace management table, in the relay unit as the one embodiment of the present invention.

(1) If, in the relay unit 200, a frame 500 is received from the sending terminal A1 of the network A, the CPU 202 stores this received frame 500 in the transmitting-receiving buffer 204a, as shown in FIG. 4.

At this time, when the frame 500 is the first one to be stored in the transmitting-receiving buffer 204a, the CPU 202 increases the frame number n to 1, because the frame number n registered in the frame-number holding portion 301c of the trace management table 301 is zero and therefore has not reached the maximum frame number MAX. Simultaneously, the CPU 202 registers the storage position of the frame 500 in the transmitting-receiving buffer 204a in the top pointer 301a and last pointer 301b of the trace management table 301.

In this embodiment, while practically the position of the frame management table 302 corresponding to the data block 303 that stores the frame 500 is respectively registered in the top pointer 301a and last pointer 301b of the trace management table 301, it will hereinafter be stated for convenience that the position of the frame 500 in the transmitting-receiving buffer 204a is registered in the top pointer 301a and last pointer 301b of the trace management table 301.

(2) The CPU 202 analyzes the header portion of the frame 500 stored in the transmitting-receiving buffer 204a and recognizes the network B to which the receiving terminal B1 belongs, and transmits the frame 500 to the network B through the corresponding interface 201b.

At this time, as described in FIGS. 10 to 12, the CPU 202 may release the storage area (data block 303) for the frame 500, excluding a predetermined area that includes its header portion, from the transmitting-receiving buffer 204a.

Figure 5:
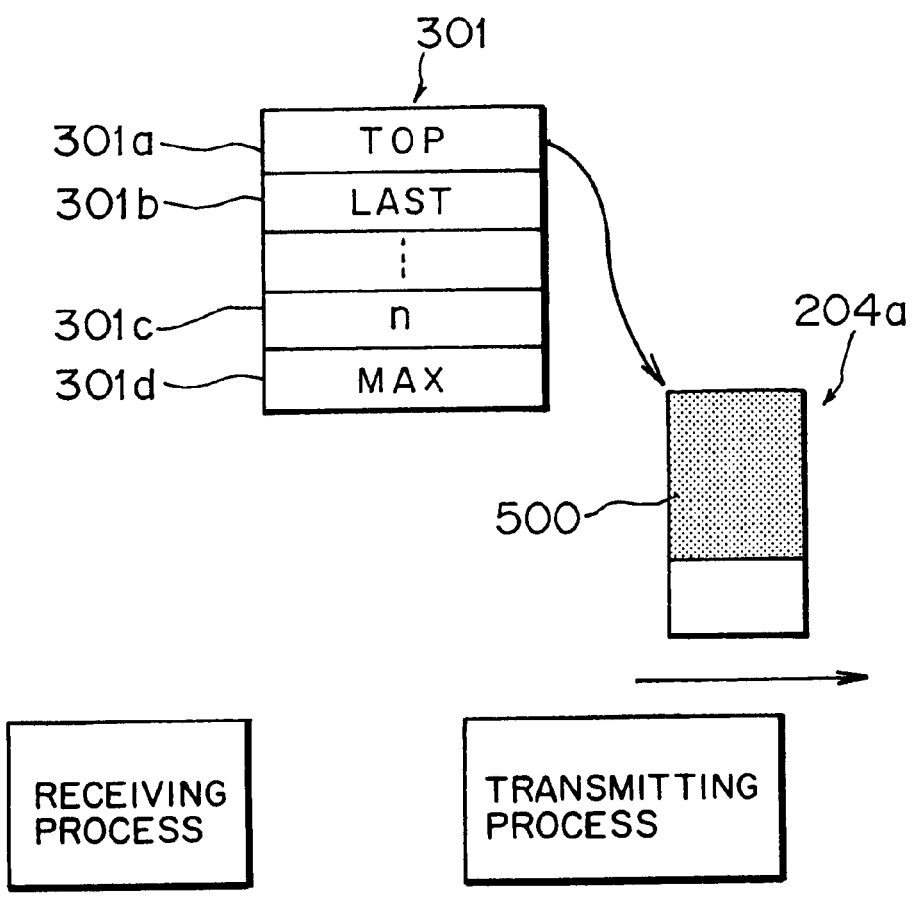
FIG. 5 is a diagram for explaining the method of managing frames stored in the transmitting-receiving buffer by the trace management table, in the relay unit as the one embodiment of the present invention.

Note that in the relay unit 200 of this embodiment, even when the process of receiving the frame 500 has ended, the position of the frame 500 in the transmitting-receiving buffer 204a remains registered in the top pointer 301a, as shown in FIG. 5, and therefore there is no possibility that at this point of time, the frame 500 in the transmitting-receiving buffer 204a will be released.

Figure 6:
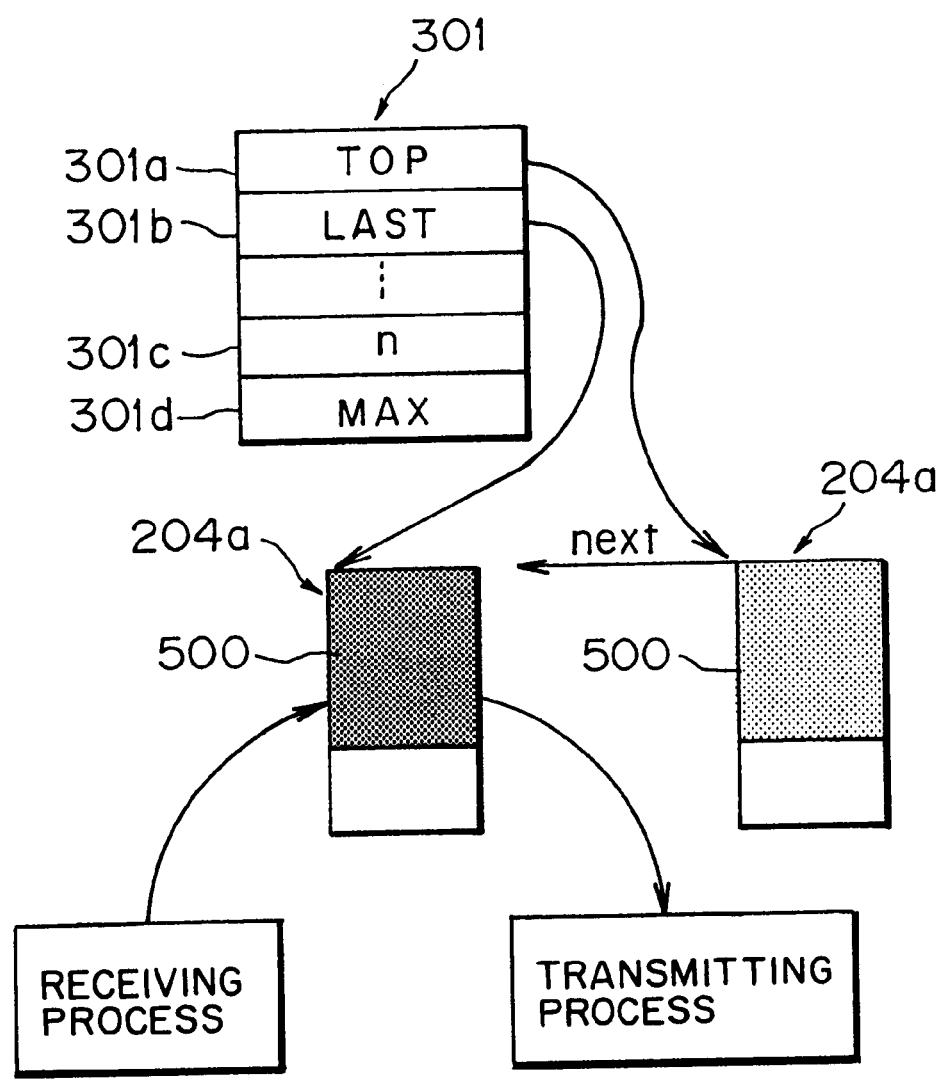
FIG. 6 is a diagram for explaining the method of managing frames stored in the transmitting-receiving buffer by the trace management table, in the relay unit as the one embodiment of the present invention.

(3) If the next frame 500 is received, the newly received frame 500 is stored in the transmitting-receiving buffer 204a and also the frame 500 is transmitted to a receiving end, as shown in FIG. 6.

At this time, the CPU 202 compares the frame number n registered in the frame-number holding portion 301c of the trace management table 301 and the maximum frame number MAX registered in the maximum-frame-number holding portion 301d. Here, if it is assumed that the frame number n has not reached the maximum frame number MAX yet, the CPU 202 counts up the frame number n in the frame-number holding portion 301c.

Also, the storage position of the newly stored frame 500 is registered in both the next-frame pointer 302c of the frame management table 302 corresponding to the frame 500 stored just before and the last pointer 301b of the trace management table 301.

That is, with the next-frame pointer 302c in the frame management table 302, the newly received frame 500 is managed in a state chained to the frame 500 stored before that, whereby the storage positions of the frames 500 in the transmitting-receiving buffer 204a are managed in order of storage.

Also, the CPU 202 can quickly judge the storage position of the newly received frame 500 in the transmitting-receiving buffer 204a, by referring to the last pointer 301b of the trace management table 301.

Figure 7:
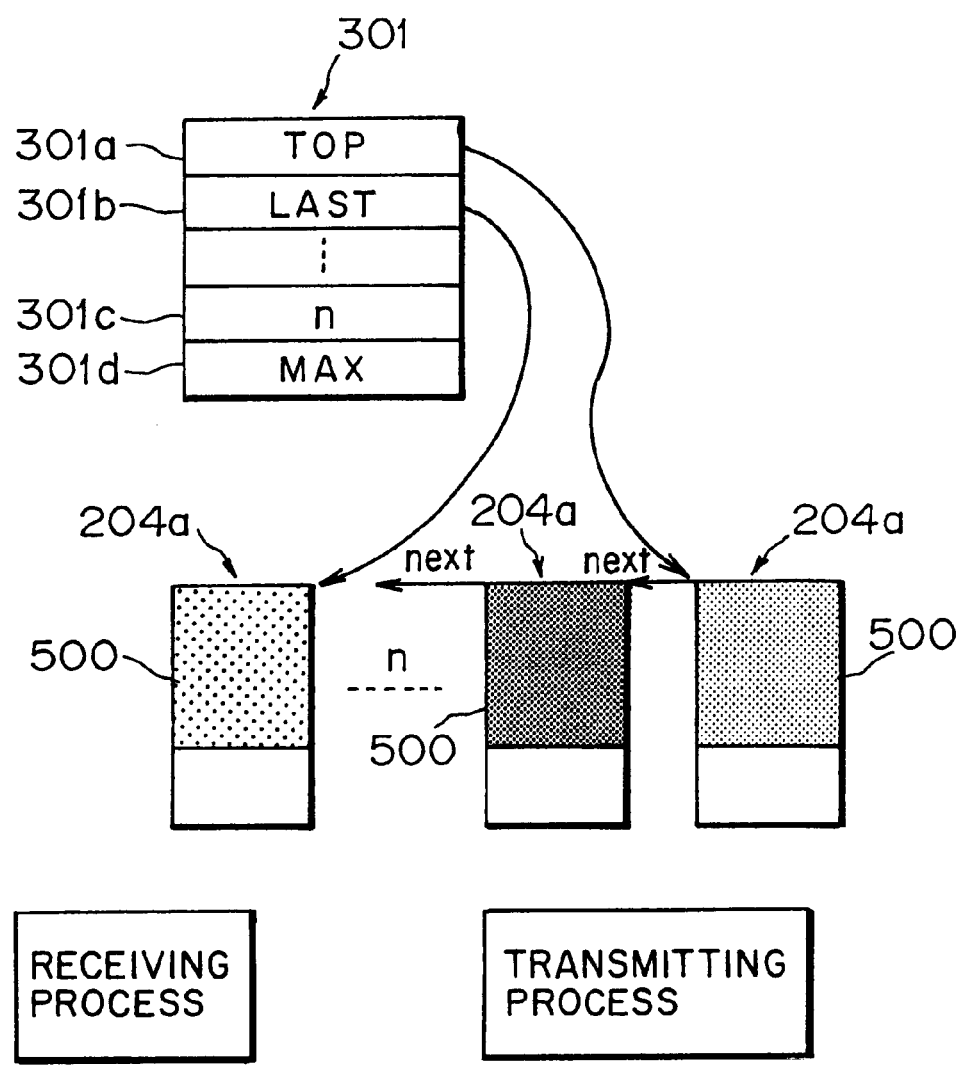
FIG. 7 is a diagram for explaining the method of managing frames stored in the transmitting-receiving buffer by the trace management table, in the relay unit as the one embodiment of the present invention.

(4) Hereinafter, the aforementioned process (3) is reiteratedly performed until the frame number n registered in the frame-number holding portion 301c of the trace management table 301 becomes equal to the maximum frame number MAX registered in the maximum-frame-number holding portion 301d, as shown in FIG. 7.

(5) As shown in FIG. 7, if the next frame 500 is received with the frame number n in the transmitting-receiving buffer 204a having reached the maximum frame number MAX, the CPU 202 registers the position of the frame 500, stored next to the oldest frame 500 in the transmitting-receiving buffer 204a, in the top pointer 301a in the trace management table 301.

Figure 8:
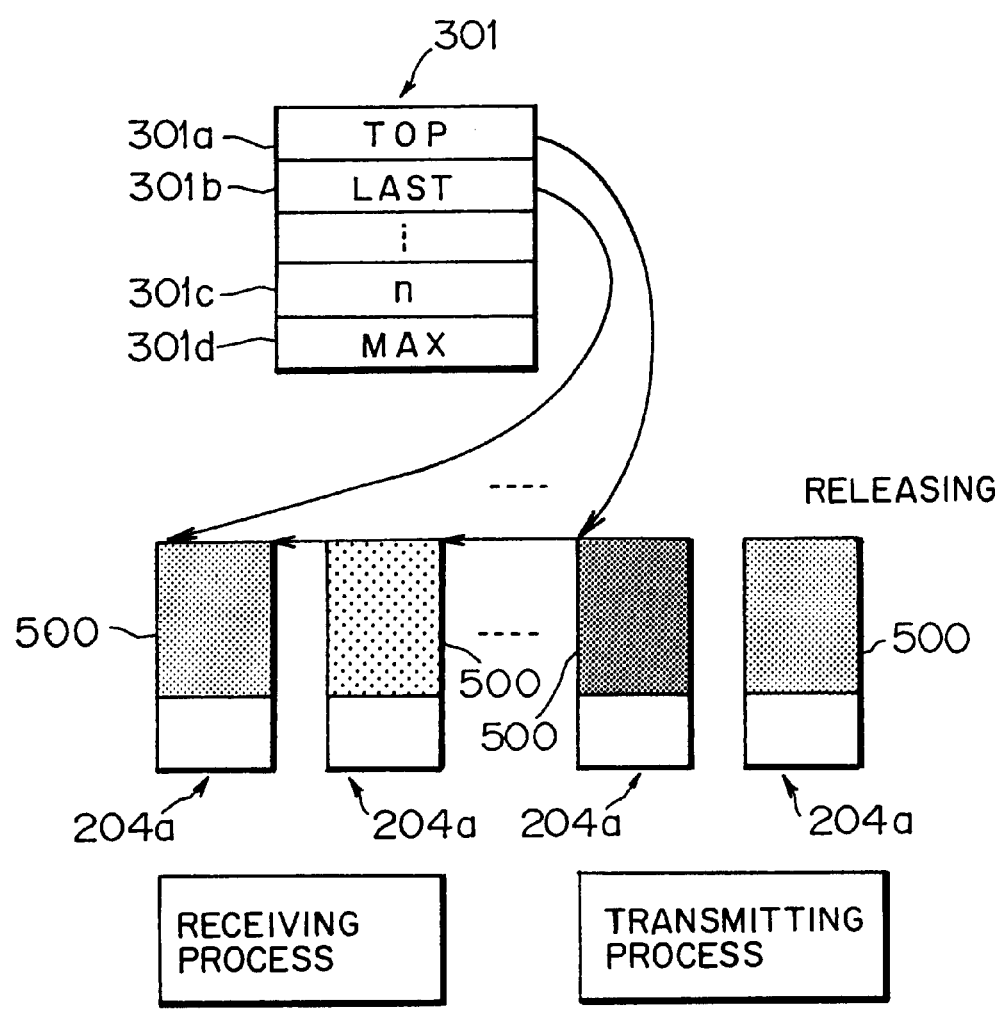
FIG. 8 is a diagram for explaining the method of managing frames stored in the transmitting-receiving buffer by the trace management table, in the relay unit as the one embodiment of the present invention.

That is, the CPU 202 rewrites the top pointer 301*a* in the trace management table 301 such that the top pointer 301*a* indicates the position of the frame management table 302 corresponding to the frame 500 stored next to the oldest frame 500 in the transmitting-receiving buffer 204*a*. With this, the storage area for the oldest frame is released from the transmitting-receiving buffer 204*a* as shown in FIG. 8, and as shown in the aforementioned (3), the newly received frame 500 is stored in the transmitting-receiving buffer 204*a* and transmitted to a receiving end.

The CPU 202 also registers the storage position of the newly stored frame 500 in both the next-frame pointer 302*c* of the frame management table 302 corresponding to the frame 500 stored just before and the last pointer 301*b* of the trace management table 301.

(6) Hereinafter, the CPU 202 repeatedly performs the aforementioned process (5), each time a new frame 500 is received. That is, a new frame 500 is held in the transmitting-receiving buffer 204*a* and the storage area for the oldest frame 500 is released from the transmitting-receiving buffer 204*a*. In this manner, a predetermined number MAX of frames is always held in the transmitting-receiving buffer 204*a*.

With this, in the relay unit 200, the transmitting-receiving buffer 204*a* functions as a kind of queue memory.

And, in tracing the history of the relaying process in the relay unit 200 of this embodiment when a fault is checked or when debugging is performed, for example, the frames 500 stored in the transmitting-receiving buffer 204*a* are traced and analyzed in order of storage.

More specifically, the position of the frame management table 302 (e.g., frame management table 302-1 in FIG. 3) in the transmitting-receiving buffer 204*a*, indicated by information registered in the top pointer 301*a* of the trace management table 301, is first judged. In the data block 303 (303-1 in FIG. 3) indicated by the data offset pointer 302*b* (data offset pointer 302*b*-1 in FIG. 3) of this frame management table 302 (frame management table 302-1 in FIG. 3), the frame 500 (frame 501 in FIG. 3) oldest among the frames 500 stored in the transmitting-receiving buffer 204*a* has been stored, so the header or the like of this frame 500 is analyzed.

And in the next-frame pointer 302*c* of the frame management table 302 (frame management table 302-1 in FIG. 3) corresponding to the aforementioned oldest frame 500 (frame 501 in FIG. 3), the position of the frame management table 302, indicating the storage position of the frame 500 (frame 502 in FIG. 3) next received, has been registered. Therefore, in the data block 303 indicated by the data offset pointer 302*b* of this frame management table 302, the second oldest frame 500 (502) has been stored, so the header or the like of this frame 500 (502) is analyzed.

Hereinafter, similarly, by making reference to the next-frame pointer 302*c* of each frame management table 302 in order, the frames 500 stored in the transmitting-receiving buffer 204*a* can be analyzed in order of storage. With this, the relaying process is traced.

Next, a method of archiving trace information indicating the history of the relaying process will be described with FIGS. 3 and 9. Note that FIG. 9 is a diagram for explaining the method of archiving history information, in the relay unit 200 of this embodiment.

Figure 9:
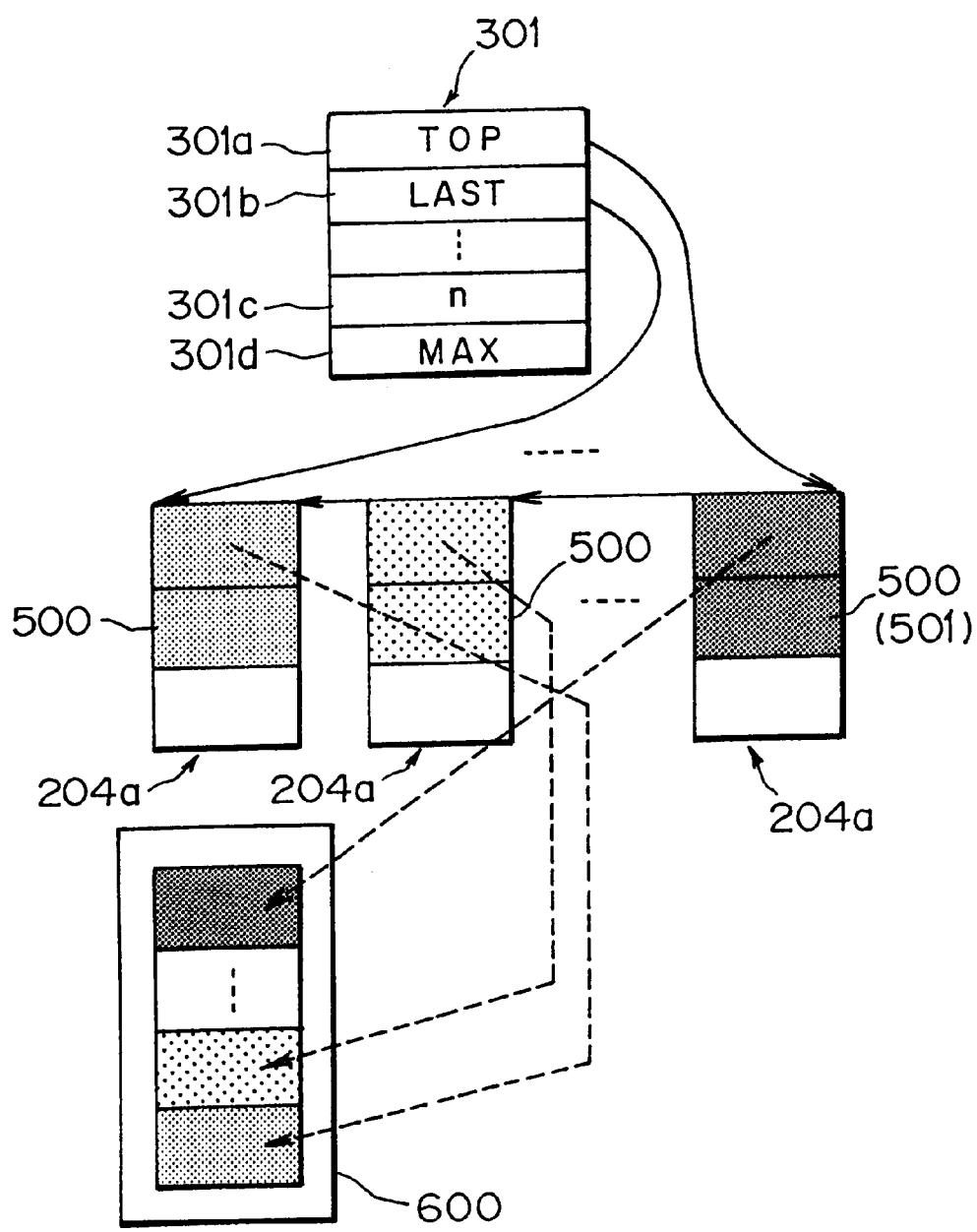
FIG. 9 is a diagram for explaining a method of archiving history, in the relay unit as the one embodiment of the present invention.

If an operator instructs the retention of trace information through the console 250 or the like, the CPU 202 first judges the position of the frame management table 302 (e.g., frame management table 302-1 in FIG. 3) in the transmitting-receiving buffer 204*a*, indicated by information registered in the top pointer 301*a* of the trace management table 301, as shown in FIG. 9. Then, the CPU 202 copies a predetermined area such as the header portion of the frame 500 (frame 501 in FIG. 3), indicated by the data offset pointer 302*b* (data offset pointer 302*b*-1 in FIG. 3) of this frame management table 302 (frame management table 302-1 in FIG. 3), to a retention medium 600, such as a floppy disk, tape and the like.

Furthermore, the CPU 202 judges the storage position of the next frame 500 (502) in the transmitting-receiving buffer 204*a* from information registered in the next-frame pointer 302*c* of the frame management table 302 (e.g., frame management table 302-1 in FIG. 3) and then copies a predetermined area of the next frame 500 (502), such as its header portion, at the position next to the position at which the predetermined area of the previous frame 500 (frame 501 in FIG. 3) was copied.

Hereinafter, for all the frames 500 stored in the transmitting-receiving buffer 204*a*, the CPU 202 copies their predetermined areas to the retention medium 600 in order of storage, referring to the next-frame pointer 302*a* in the frame management table 302. The copied areas are archived as trace information in order of storage.

Note that in the case where only the aforementioned predetermined area for each frame 500 has been stored in the transmitting-receiving buffer 204*a* by using the control function described in FIGS. 10 to 12, all the predetermined areas, as they are, are copied to the retention medium 600 as trace information.

Also, when trace information is displayed on the screen of the console 250, or the like, the trace information, generated and archived as describe above, may be displayed on the display screen or the like. Or, instead of archiving trace information in the retention medium 600, all the predetermined areas for the frames 500 in the transmitting-receiving buffer 204*a* may be displayed in order of storage in the same way as the aforementioned method of archiving trace information.

According to the relay unit 200 as one embodiment of the present invention, as described above, the storage positions of the frames 500 in the transmitting-receiving buffer 204*a* are managed in order of storage by the trace management table 301 and the frame management table 302. Also, the CPU-202 controls the storage of the frame 500 to the transmitting-receiving buffer 204*a* and the release of the storage area for the frame 500 from the transmitting-receiving buffer 204*a*, referring to the trace management table 301 and the frame management table 302. Furthermore, the CPU 202 holds the frames 500 in the transmitting-receiving buffer 204*a*, and after the frame number n in the transmitting-receiving buffer 204*a* has reached the maximum frame number MAX, the CPU 202 releases the storage area for the oldest frame 500 from the transmitting-receiving buffer 204*a*, every time a new frame 500 is stored in the transmitting-receiving buffer 204*a*. Therefore, in the transmitting-receiving buffer 204*a*, a predetermined number n of frames 500, including the newest frame 500, are always stored in order of storage.

With this, when tracing is performed, the contents of the relaying process can easily be traced by tracing the transmitting-receiving buffer 204*a*, referring to the trace management table 301 and the frame management table 302.

Also, for tracing, the header portion or the like of the frame 500 does not need to be copied or moved to a dedicated area (a trace buffer, etc.) formed on memory, as trace data. Besides, processing such as dividing and reconstituting of frames 500 is also unnecessary. The process of tracing frames 500 can be performed at high speeds without incurring an increase in the overhead time of the CPU 202 and process complexity, whereby the time for processing the entire unit can be shortened.

In addition, in this embodiment, there is no possibility that an increase in the manufacturing cost will be incurred, because there is no need to provide a dedicated memory or the like for storing trace data. This embodiment can also utilize the area of the RAM 204, as a dedicated area for storing trace data does not need to be ensured on the RAM 204.

Additionally, trace information can easily be archived at high speeds because, for all the frames 500 stored in the transmitting-receiving buffer 204a, the CPU 202 copies their predetermined areas to the retention medium 600 in order of storage and achieves them as trace information, making reference to the trace management table 301 and the frame management table 302.

Moreover, there is no need to clear all the dedicated area for storing trace data, because when the release of the frame 500 in the transmitting-receiving buffer 204a is performed, all that are required is to release the storage area (data block 303) for the oldest frame 500 from the transmitting-receiving buffer 204a by the top pointer 301a of the race management table 301. Therefore, the storage area (data block 303) for the oldest frame 500 can be released from the transmitting-receiving buffer 204a at high speeds, whereby a storage area (data block 303) for storing the newest frame 500 can be ensured.

Furthermore, only the required portions for trace information can be archived and in the relay unit 200 of this embodiment the transmitting-receiving buffer 204a can be used efficiently, by setting a trace area or length to be held in the transmitting-receiving buffer 204a by the console 250, and also by removing the storage area (data block 303) for the frame 500 other than the set trace area (trace length) from the transmitting-receiving buffer 204a after transmitting the frame 500 stored in the transmitting-receiving buffer 204a, with the control function described in FIGS. 10 through 12.

In general, in tracing the frame 500, it is rare to sample to all the data of the frame 500. Therefore, even if the storage area in the transmitting-receiving buffer 204a, excluding an area necessary for tracing, such as the header portion or the like in the frame 500, were released from the transmitting-receiving buffer 204a, there would be no influence on the tracing operation. Thus, the storage area in the transmitting-receiving buffer 204a for tracing the frame 500 can be reduced, whereby the efficiency of using the transmitting-receiving buffer 204a can be enhanced.

In the aforementioned embodiment, although a description has not been particularly made of the method of storing frames 500 in the transmitting-receiving buffer 204a, the method may be controlled- by the CPU 202 when the frames are stored in the transmitting-receiving buffer 204a. Or the frames 500 may be stored by the function of direct memory access (DMA).

While the present invention has been-described with reference to the preferred embodiment thereof, the invention is not to be limited to the details given herein, but may be modified within the scope of the appended claims.

What is claimed is:

1. A relay unit relaying frames between a sending source and a receiving end by transmitting said frames from a transmitting-receiving buffer to said receiving end after said frames received from said sending source have temporarily been stored in said transmitting-receiving buffer, said relay unit having a trace unit comprising:

a management table in which storage positions of said frames in said transmitting-receiving buffer are managed in order of storage, wherein said order of storage is the order of receipt of said frames, and said management table comprises frame management tables corresponding, respectively, to the frames, in which storage positions of the respective frames are registered, a trace management table in which a position of the frame management table corresponding to an oldest frame and a position of the frame management table corresponding to a newest frame are registered as a head-frame pointer and a last-frame pointer, respectively, and in each said frame management table, a position of the frame management table corresponding to a frame stored next to a corresponding frame in said transmitting-receiving buffer is registered as a next-frame pointer; and a control section that controls both storage of each said frame in a storage area for each said frame in said transmitting-receiving buffer, and release of the storage area for each said frame from said transmitting-receiving buffer by referring to said management table, wherein said control section causes said transmitting-receiving buffer to hold said frames and also releases the storage area in which the oldest frame among said frames is stored, from said transmitting-receiving buffer, each time a new frame is stored in said transmitting-receiving buffer after the number of said frames in said transmitting-receiving buffer has reached a predetermined number.

2. The relay unit as set forth in claim 1, wherein said control section releases said storage area, in which the oldest frame is stored, from said transmitting-receiving buffer, by rewriting said head-frame pointer in said trace management table such that said head frame pointer indicates the position of the frame management table corresponding to the frame received immediately subsequent to said oldest frame.

3. The relay unit as set forth in claim 2, wherein the number of said frames and said predetermined number in said transmitting-receiving buffer are registered in said trace management table; and said control section discriminates whether or not the number of said frames in said transmitting-receiving buffer has reached said predetermined number, by referring to said trace management table.

4. The relay unit as set forth in claim 3, wherein said control section causes a retention medium to copy and archive a predetermined area for each said frame provided in transmitting-receiving buffer as trace information; and said predetermined areas are copied in said order of storage.

5. The relay unit as set forth in claim 3, wherein said control section causes said transmitting-receiving buffer to hold only a predetermined area for each said frame provided in said transmitting-receiving buffer and releases said storage area for each said frame, excluding said predetermined area, from said transmitting-receiving buffer.

6. The relay unit as set forth in claim 5, further comprising a specification section for specifying said predetermined area to be held in said transmitting-receiving buffer.

7. The relay unit as set forth in claim 2, wherein
said control section causes a retention medium to copy and archive a predetermined area for each said frame provided in transmitting-receiving buffer as trace information; and
said predetermined areas are copied in said order of storage.

8. The relay unit as set forth in claim 2, wherein
said control section causes said transmitting-receiving buffer to hold only a predetermined area for each said frame provided in said transmitting-receiving buffer and releases said storage area for each said frame, excluding said predetermined area, from said transmitting-receiving buffer.

9. The relay unit as set forth in claim 8, further comprising a specification section for specifying said predetermined area to be held in said transmitting-receiving buffer.

10. The relay unit as set forth in claim 1, wherein
the number of said frames and said predetermined number in said transmitting-receiving buffer are registered in said trace management table; and
said control section discriminates whether or not the number of said frames in said transmitting-receiving buffer has reached said predetermined number, by referring to said trace management table.

11. The relay unit as set forth in claim 10, wherein
said control section causes a retention medium to copy and archive a predetermined area for, each said frame provided in transmitting-receiving buffer as trace information; and
said predetermined areas are copied in said order of storage.

12. The relay unit as set forth in claim 10, wherein
said control section causes said transmitting-receiving buffer to hold only a predetermined area for each said frame provided in said transmitting-receiving buffer and releases said storage area for each said frame, excluding said predetermined area, from said transmitting-receiving buffer.

13. The relay unit as set forth in claim 12, further comprising a specification section for specifying said predetermined area to be held in said transmitting-receiving buffer.

14. The relay unit as set forth in claim 1, wherein
said control section causes a retention medium to copy and archive a predetermined area for each said frame provided in transmitting-receiving buffer as trace information; and
said predetermined areas are copied in said order of storage.

15. The relay unit as set forth in claim 1, wherein
said control section causes said transmitting-receiving buffer to hold only a predetermined area for each said frame provided in said transmitting-receiving buffer and releases said storage area for each said frame, excluding said predetermined area, from said transmitting-receiving buffer.

16. The relay unit as set forth in claim 15, further comprising a specification section for specifying said predetermined area to be held in said transmitting-receiving buffer.

17. In a relay unit for relaying frames between a sending source and a receiving end by transmitting said frames from a transmitting-receiving buffer to said receiving end after said frames received from said sending source have temporarily been stored in said transmitting-receiving buffer, a method comprising:
tracing said frames to obtain a history of the relaying operation, said tracing including
holding said frames in storage areas in said transmitting-receiving buffer, while storage positions of said frames in said transmitting-receiving buffer are being managed in order of storage, wherein said order of storage is the order of receipt of said frames; and
releasing the storage area, in which the oldest frame among said frames is stored, from said transmitting-receiving buffer after said frame is transmitted to said receiving end, each time a new frame is stored in said transmitting-receiving buffer after the number of said frames in said transmitting-receiving buffer has reached a predetermined number,
wherein a predetermined area of the storage area for each said frame in said transmitting-receiving buffer is traceably held in said transmitting-receiving buffer when the storage area is released from said transmitting-receiving buffer, and
the predetermined area for each said frame includes a header portion of said corresponding frame.

18. The method as set forth in claim 17, wherein
the predetermined area for each said frame in said transmitting-receiving buffer is copied to a retention medium in order of storage and archived as trace information.

19. In a relay unit relaying frames between a sending source and a receiving end by transmitting said frames from a transmitting-receiving buffer to said receiving end after said frames received from said sending source have temporarily been stored in said transmitting-receiving buffer, a method comprising:
tracing said frames to obtain a history of the relaying operation, said tracing including
holding said frames in storage areas in said transmitting-receiving buffer, while storage positions of said frames in said transmitting-receiving buffer are being managed in order of storage, wherein said order of storage is the order of receipt of said frames, and
releasing the storage area, in which an oldest frame among said frames is stored, from said transmitting-receiving buffer after said frame is transmitted to said receiving end, each time a new frame is stored in said transmitting-receiving buffer after a number of said frames in said transmitting-receiving buffer has reached a predetermined number,
wherein a predetermined area of the storage area for each said frame in said transmitting-receiving buffer is traceably held in said transmitting-receiving buffer when the storage area is released from said transmitting-receiving buffer,
the predetermined area for each said fame includes a header portion of said corresponding frame, and
a management table includes
frame management tables corresponding, respectively, to the frames, in which storage positions of the respective frames are registered,
a trace management table in which a position of the frame management table corresponding to said oldest frame and a position of the frame management table corresponding to a newest frame are registered as a head-frame pointer and a last-frame pointer, respectively; and in each said frame management table, a position of the frame management table corresponding to a frame stored next to a corresponding frame in said transmitting-receiving buffer is registered as a next-frame pointer, and wherein releasing of the storage area in which the oldest frame among said frames is stored, is performed by rewriting said head-frame pointer in said trace management table such that said head-frame pointer indicates the position of the frame management table corresponding to the frame received immediately subsequent to said oldest frame.

\* \* \* \* \*

UNITED STATES PATENT AND TRADEMARK OFFICE
CERTIFICATE OF CORRECTION

PATENT NO. : 6,822,967 B1
DATED : November 23, 2004
INVENTOR(S) : Shunpei Nishikawa It is certified that error appears in the above-identified patent and that said Letters Patent is hereby corrected as shown below:

Title page,
Item [56], References Cited, FOREIGN PATENT DOCUMENTS, insert the following
-- JP 10-173736   6/26/98
  JP 5-233497    9/10/93
  JP 63039237    2/19/88 --

Signed and Sealed this

Nineteenth Day of July, 2005

JON W. DUDAS
*Director of the United States Patent and Trademark Office*